United States Patent
Books

(10) Patent No.: US 11,548,495 B2
(45) Date of Patent: Jan. 10, 2023

(54) TORQUE DERATION IN RESPONSE TRACTION CONTROL EVENTS

(71) Applicant: Cummins Inc., Columbus, IN (US)

(72) Inventor: Martin T. Books, Columbus, IN (US)

(73) Assignee: Cummins Inc., Columbus, IN (US)

( * ) Notice: Subject to any disclaimer, the term of this patent is extended or adjusted under 35 U.S.C. 154(b) by 380 days.

(21) Appl. No.: 16/815,433

(22) Filed: Mar. 11, 2020

(65) Prior Publication Data

US 2020/0207329 A1    Jul. 2, 2020

Related U.S. Application Data

(63) Continuation of application No. PCT/US2018/047477, filed on Aug. 22, 2018.

(Continued)

(51) Int. Cl.
| | |
|---|---|
| *B60W 20/15* | (2016.01) |
| *B60L 7/18* | (2006.01) |
| *F02D 13/02* | (2006.01) |
| *F01L 13/06* | (2006.01) |
| *B60K 6/24* | (2007.10) |
| *B60K 6/26* | (2007.10) |

(Continued)

(52) U.S. Cl.
CPC .............. *B60W 20/15* (2016.01); *B60K 6/24* (2013.01); *B60K 6/26* (2013.01); *B60K 6/28* (2013.01); *B60K 6/36* (2013.01); *B60L 7/18* (2013.01); *B60W 10/06* (2013.01); *B60W 10/08* (2013.01); *B60W 10/184* (2013.01); *B60W 10/196* (2013.01); *F01L 13/06* (2013.01); *F02D 13/0249* (2013.01); *B60L 2250/28* (2013.01); *B60W 2540/10* (2013.01)

(58) Field of Classification Search
CPC ...... B60W 20/15; B60W 10/06; B60W 10/08; B60W 10/184; B60W 10/196; B60W 2540/10; B60W 10/18; B60W 30/18172; B60W 2710/083; B60W 30/18127; B60K 6/24; B60K 6/26; B60K 6/28; B60K 6/36; B60L 7/18; B60L 2250/28; B60L 2240/423; B60L 2240/80; B60L 2250/26; B60L 2260/26; B60L 7/26; B60L 15/2009; B60L 15/2072; B60L 3/108; F01L 13/06; F02D 13/0249; Y02T 10/64; Y02T 10/72

See application file for complete search history.

(56) References Cited

U.S. PATENT DOCUMENTS

| | | | | |
|---|---|---|---|---|
| 5,025,882 | A | * | 6/1991 | Ghoneim ................ B60T 8/175 180/197 |
| 5,492,192 | A | * | 2/1996 | Brooks ................ B60T 8/4863 701/84 |

(Continued)

OTHER PUBLICATIONS

Search Report and Written Opinion, PCT Appln. No. PCT/US2018/047477, 9 pgs, dated Oct. 19, 2018, dated Oct. 19, 2018.

(Continued)

*Primary Examiner* — Brian P Sweeney
(74) *Attorney, Agent, or Firm* — Taft, Stettinius & Hollister LLP

(57) ABSTRACT

A method, apparatus, and system are disclosed for incrementally derating a torque applied by a drivetrain in response a number of traction control events detected by a traction control system over a predetermined time period.

17 Claims, 2 Drawing Sheets

Related U.S. Application Data

(60) Provisional application No. 62/570,706, filed on Oct. 11, 2017.

(51) Int. Cl.
 *B60K 6/36* (2007.10)
 *B60K 6/28* (2007.10)
 *B60W 10/184* (2012.01)
 *B60W 10/196* (2012.01)
 *B60W 10/06* (2006.01)
 *B60W 10/08* (2006.01)

(56) References Cited

U.S. PATENT DOCUMENTS

| | | |
|---|---|---|
| 6,687,593 B1 | 2/2004 | Crombez et al. |
| 6,709,075 B1 | 3/2004 | Crombez et al. |
| 7,152,934 B2 | 12/2006 | Fuhrer et al. |
| 7,441,845 B2 | 10/2008 | Crombez et al. |
| 8,788,144 B2 | 7/2014 | Krueger et al. |
| 2005/0150702 A1 | 7/2005 | Matsuzki |
| 2006/0080022 A1 | 4/2006 | Hrovat et al. |
| 2007/0108838 A1 | 5/2007 | Shaffer et al. |
| 2014/0297079 A1 | 10/2014 | Saitoh |
| 2016/0288650 A1 | 10/2016 | Ponziani |

OTHER PUBLICATIONS

International Preliminary Report on Patentability; The International Bureau of WIPO; International Application No. PCT/US2018/047477; dated Apr. 14, 2020; 7 pages.

Examination Report, UK Application No. GB2005298.1, dated Nov. 30, 2021, 2 pgs.

* cited by examiner

TORQUE DERATION IN RESPONSE TRACTION CONTROL EVENTS

CROSS-REFERENCE TO RELATED APPLICATION

The present application is a continuation of International Application No. PCT/US18/47477 filed on Aug. 22, 2018, and claims priority to and the benefit of U.S. Application No. 62/570,706 filed on Oct. 11, 2017, the disclosures of which are hereby incorporate by reference.

GOVERNMENT RIGHTS

This invention was made with Government support under DE-EE0007514 awarded by DOE. The Government has certain rights in this invention."

BACKGROUND

Environmental concerns and limited natural resources are highlighting the desire for reduced fuel consumption. One promising avenue toward the reduction of fuel consumption is the use of hybrid and electric powertrains. Such powertrains utilize regenerative braking to increase the overall efficiency of the system. Regenerative braking provides negative torque to the driveline and recovers kinetic energy from a moving vehicle and utilizes the recovered energy to store electrical potential energy. Vehicles may also include other types of braking systems that create negative torque, such as compression release braking and exhaust braking, and of course accelerator pedals to create positive torque.

Most vehicles today are provided with a traction control system, such as an anti-lock brake system (ABS). The traction control system detects loss of traction between the wheels and the road surface such as may occur during a torque change. The traction control system intervenes in response to a traction control event during a torque change by sending a command to the engine/motor controller or retarder controller to derate traction and/or retard torque on the driveline during the traction control event. When the traction control event is over, the derate is removed at a controlled rate to avoid problems with a sudden reapplication of torque.

In presently available hybrid and electric powertrain systems, regenerative and other braking is typically triggered by means other than actuation of the brake pedal, such as at the low end of the accelerator pedal when it is lifted or released. As a result, by lifting of the accelerator pedal a significant amount of braking is automatically applied, which may create a traction control event in slick conditions. Since the amount of negative torque that is applied is predetermined and typically based on dry road conditions and other factors, poor traction road conditions are likely to produce multiple traction control events because the same amount of negative torque is re-applied to the powertrain each time the braking event occurs, regardless of any history of traction loss. Therefore, further technological developments are desirable in this area.

SUMMARY

The disclosed embodiment includes systems, methods, and apparatus for incrementally derating a torque applied by a drivetrain in response a number of traction control events detected by a traction control system over a predetermined time period. Further embodiments, forms, objects, features, advantages, aspects, and benefits shall become apparent from the following description and drawings.

DESCRIPTION OF THE ILLUSTRATIVE EMBODIMENTS

Figure 1:
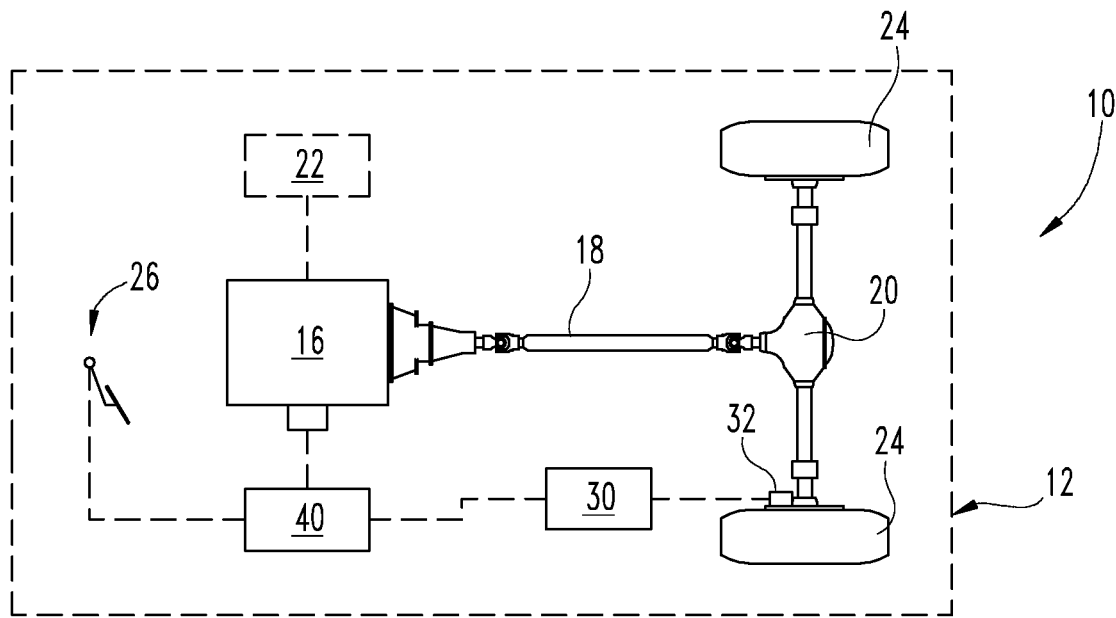
FIG. 1 is a schematic block diagram of a vehicle with a traction control system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, an exemplary system 10 includes a vehicle 12. System 100 further includes a powertrain 14 having a prime mover 16. Prime mover 16 may include an internal combustion engine and/or one or more electric devices selectively coupled to a drive shaft 18. The prime mover 16 may be any type of internal combustion engine and/or electric motor known in the art arranged to provide a hybrid powertrain, an electric powertrain, or an internal combustion engine powertrain. In the example of FIG. 1, the prime mover 16 is coupled to the driveshaft 18 through a transmission 20.

The system 10 further includes an optional electrical energy storage device 22 that can be connected to prime mover 16. Electrical energy storage device 22 is electrically connected to store electricity generated by the vehicle 12. The electrical energy storage device 22 can be a battery such as a lithium ion battery, a lead-acid battery, a nickel metal hydride battery, or any other device capable of storing electrical energy. In certain embodiments, energy may be stored non-electrically, for example in a high performance fly wheel, in a compressed air tank, and/or through deflection of a high capacity spring. Where the energy is stored electrically, any electrical energy storage device 22 is contemplated herein, including a hyper-capacitor and/or an ultra-capacitor.

In certain embodiments, the system 10 includes the drive shaft 18 mechanically coupling the prime mover 16 to two or more vehicle drive wheels 24. The system 10 may include any other type of load other than or in addition to a drive wheels 24, for example any load that includes stored kinetic energy that may intermittently be slowed by any braking device included in the power train 14. An exemplary system 10 includes one or more mechanical braking devices responsive to a mechanical braking command.

An exemplary mechanical braking device includes a compression braking device (not shown), for example a device that adjusts the valve timing of a prime mover that includes an engine such that the engine becomes a torque absorber rather than a torque producer. Another exemplary mechanical braking device includes an exhaust throttle (or exhaust brake) that, in moving toward a closed position, partially blocks an exhaust stream and applies back pressure on the engine resulting in a negative crankshaft torque amount. Yet another exemplary mechanical braking device is a variable geometry turbocharger (VGT) device that can be adjusted to produce back pressure on the engine and provide a braking effect. Still another exemplary mechanical braking device includes a hydraulic retarder. The hydraulic retarder is typically incorporated with the transmission 20. The mechanical braking device may be any braking device which is not the conventional friction brakes of the vehicle 12, and the described examples are not exclusive.

The system 10 further includes a torque request device 26 that provides a torque request value. An exemplary deceleration request device comprises a throttle pedal position sensor. However, any device understood in the art to provide a torque request value, or a value that can be correlated to a present negative torque change request or positive torque change request for the powertrain 14 is contemplated herein. As used herein, negative braking torque includes vehicle braking provided by or able to be provided by the powertrain 14 without friction braking.

System 10 also includes a traction control system 30 connected to one or more wheels 24. Traction control system 30 is configured to detect a traction control event associated with wheels 24. In certain embodiments, the traction control event is a loss of traction determined by, for example, and antilock brake system (ABS) 32. For example, the loss of traction can be detected by ABS 32 in response to one or more of wheels 24 slipping on a road surface. A traction control event signal is provided to controller 40 to derate the nominal torque applied by powertrain 14 to wheels 24 to reduce slippage in response to the traction control event.

As discussed further below, controller 40 is configured to incrementally change the derate torque applied by powertrain 14 over a number of traction control events to gradually reduce the nominal torque. After a predetermined period of time expires with no traction control events, the incrementally reduced derate torque is released to gradually return to the nominal derate torque. In one embodiment, this allows fuel economy to be increased by more fully utilizing available regenerative braking torque capacity during traction control events The controller 40 of system 10 may include modules structured to functionally execute operations for managing the torque derate of powertrain 14. Controller 40 is linked to torque request device 26 and powertrain 14. In certain embodiments, the controller 40 forms a portion of a processing subsystem including one or more computing devices having memory, processing, and communication hardware. The controller 40 may be a single device or a distributed device, and the functions of the controller 40 may be performed by hardware or instructions encoded on a computer readable medium.

In certain embodiments, the controller 40 includes one or more modules structured to functionally execute the operations of the controller 40. The description herein including modules emphasizes the structural independence of the aspects of the controller 40, and illustrates one grouping of operations and responsibilities of the controller 40. Other groupings that execute similar overall operations are understood within the scope of the present application. Modules may be implemented in hardware and/or instructions on a computer readable medium, and modules may be distributed across various hardware or computer related components. More specific descriptions of certain embodiments of controller operations are included in the section referencing FIG. 2.

Certain operations described herein include interpreting or determining one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
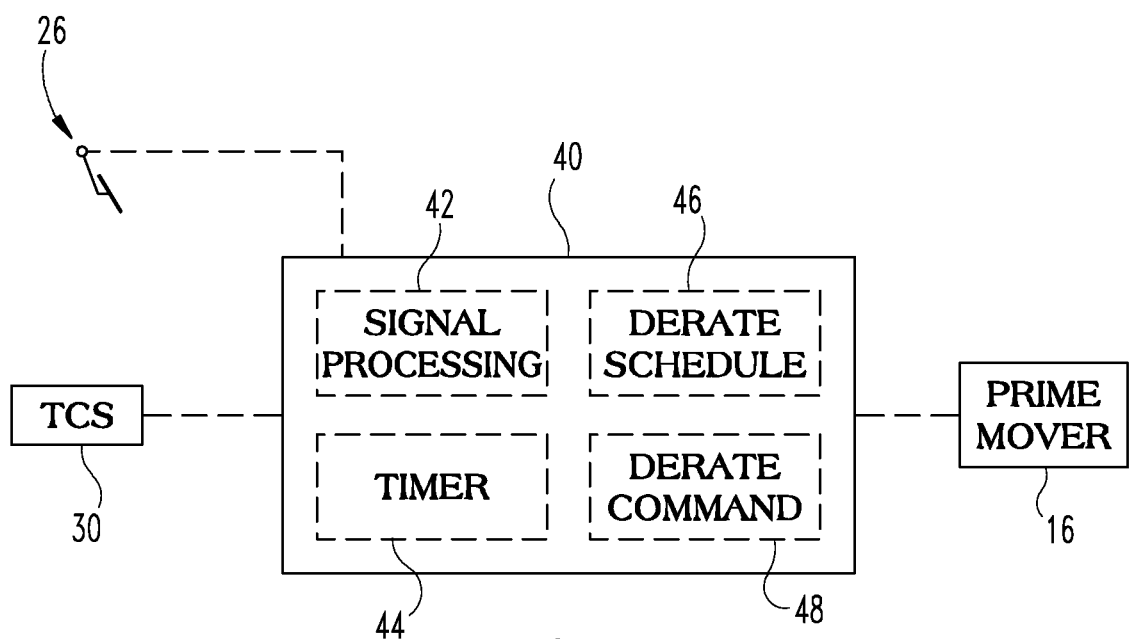
FIG. 2 is a schematic view of a controller that functionally executes certain operations for managing traction control events.

FIG. 2 is a schematic view of controller apparatus 40 that includes a signal processing module 42, a timer 44, a torque derate schedule 46, and a derate command module 48. Specific embodiments of the controller 40 may omit certain modules or have additional modules, as will be understood by the description herein and the claims following. Controller 40 receives inputs from torque request device 26 and traction control system 30.

Torque request device provides a deceleration or acceleration request value is a quantitative description of an amount of deceleration or acceleration requested for the application. Exemplary deceleration request values include an accelerator pedal position being in a condition indicating a deceleration request—for example the accelerator pedal position within a low deadband position that is determined to be equivalent to a zero accelerator pedal position. The position of the accelerator pedal that is equivalent to a zero accelerator pedal position varies with the application and is understood to one of skill in the art. Exemplary positions include an accelerator pedal position lower than 10% of a maximum accelerator pedal position, or any other value including an accelerator pedal position lower than 30% of the maximum. In many applications, the percentage of "dead band" will be configurable by a vehicle manufacturer or an original equipment manufacturer (OEM). While the accelerator pedal position may be utilized to send a deceleration request value, other non-limiting accelerator indicators may be used to determine the deceleration request value, including an accelerator pressure or electronic drive by wire accelerator indication.

Traction control system 30 is operable to provide a signal indicative of a loss of traction control. For example, activation of ABS 32 can be used to indicate a loss of traction at wheels 24. Signal processing module 42 processes these signals to determine a traction control event. Controller 40 may also receive a compression braking signal or exhaust brake signal that indicates whether or not compression or exhaust braking is to be employed.

The traction control event results in a maximum derate of the torque applied by powertrain 14 to wheels 14 to minimize slippage. The torque derate can be a derate of negative torque for braking or positive torque for acceleration. Controller 40 also includes a timer 44 that tracks a time associated with and between traction control events and a derate schedule. In response to each of one or more subsequent traction control events that occur within a predetermined time period, controller 40 incrementally changes the torque derate from the maximum torque derate to a lesser torque derate according to torque derate schedule 46. The incremental changes can be step-wise, linear, or non-linear. The exemplary controller 40 further provides a torque derate command 48 to prime mover 16 that controls the torque derate according to the torque derate schedule 46 in response to the traction control event.

Figure 3:
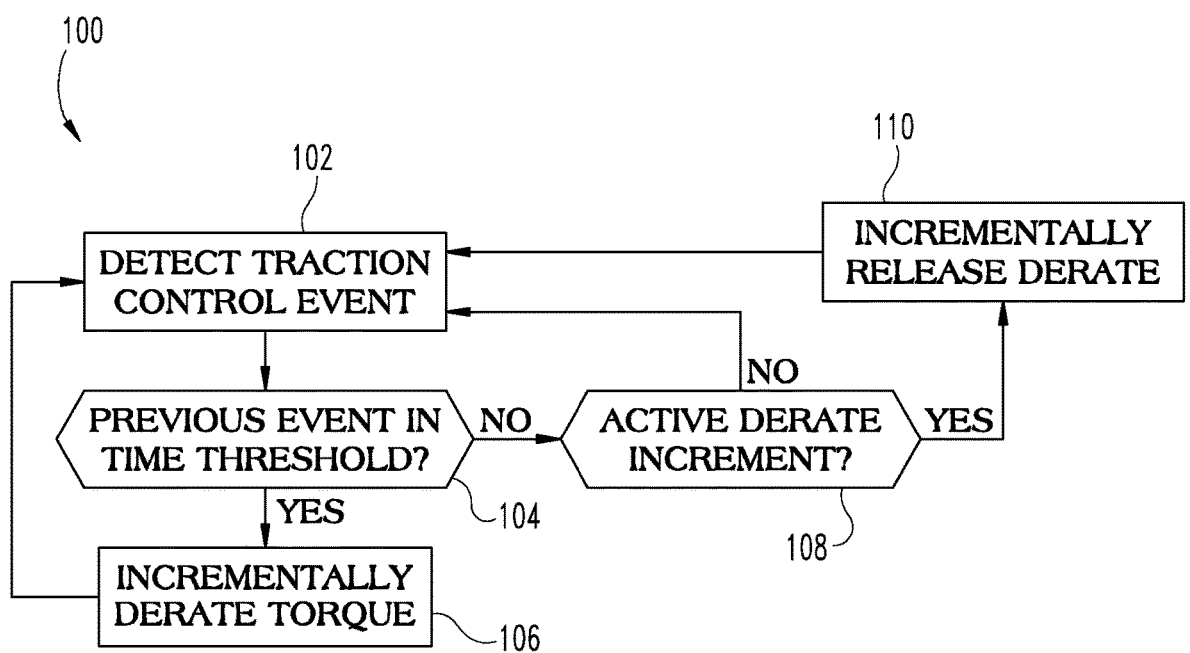
FIG. 3 is a schematic flow diagram of a procedure for managing traction control events.

Referring further to FIG. 3, an exemplary procedure 100 includes an operation 102 to detect a traction control event. Procedure 100 continues at conditional 104 to determine with a previous traction control event occurred in a predetermined time threshold. If conditional 104 is positive, procedure 100 continues at operation 106 to incrementally derate, from a nominal or maximum torque, the torque that is applied to powertrain 14 in response to the traction control event. Procedure 100 continues from operation 106 at operation 102 to detect a subsequent traction control event.

If conditional 104 is negative, procedure 100 continues at conditional 108 to determine if a torque derate increment from the nominal or maximum derate torque is active. If conditional 108 is negative procedure 100 returns to operation 102. If conditional 108 is positive, procedure 100 continues at operation 110 to incrementally release the torque derate from the incremented torque derate toward the maximum or nominal torque derate so that the torque derate gradually returns toward the maximum or nominal torque derate. Procedure 100 returns from operation 110 to operation 102.

Procedure 100 includes detecting a plurality of traction control events for a vehicle in which the vehicle loses traction with a road surface at each traction control event. Procedure 100 further includes, in response to detecting each of the plurality of traction control events, incrementally derating a torque applied to a powertrain of the vehicle for each subsequent traction control event relative to a previous traction control event.

In certain embodiments of procedure 100, detecting the traction control event includes interpreting a signal from a traction control system of the vehicle indicative of a loss of traction. In further embodiments, the traction control system is an anti-lock brake system of the vehicle.

In other embodiments of procedure 100, derating the torque further includes one of derating a negative braking torque and derating a positive drive torque. Derating the torque may further include limiting or reducing incrementally the negative braking torque applied by regenerative braking. Derating the torque may also include limiting or reducing incrementally the negative braking torque applied by compression release braking. Derating the torque may also include limiting or reducing incrementally the negative braking torque applied by exhaust braking.

In other embodiments, procedure 100 includes incrementally derating the torque for a plurality of traction control events detected over a predetermined period of time. After an expiration of a period of time since a last traction control event, procedure 100 includes incrementally releasing or increasing the derating of torque toward a maximum allowable torque to be applied to the powertrain in response to the traction control event. In other embodiment, procedure 100 includes incrementally derating the torque only after two or more traction control events are detected.

As is evident from the figures and text presented above, a variety of embodiments according to the present invention are contemplated.

According to one aspect, a method is provided that includes detecting a plurality of traction control events for a vehicle in which the vehicle loses traction with a road surface at each traction control event; and, in response to detecting the plurality of traction control events, incrementally derating a torque applied to a powertrain of the vehicle for a subsequent traction control event relative to a previous traction control event.

In one embodiment of the method, detecting the traction control event includes interpreting a signal from a traction control system of the vehicle indicative of a loss of traction. In a refinement of this embodiment, the traction control system is an anti-lock brake system of the vehicle.

In another embodiment of the method, derating the torque further includes one of derating a negative braking torque and derating a positive drive torque. In a refinement of this embodiment, derating the torque further includes limiting the negative braking torque applied by regenerative braking. In another refinement, derating the torque further includes limiting the negative braking torque applied by compression release braking. In yet a further refinement, derating the torque further includes limiting the negative braking torque applied by exhaust braking.

In yet another embodiment of the method, incrementally derating the torque includes incrementally derating the torque for a plurality of traction control events detected over a predetermined period of time. In a refinement of this embodiment, the method further includes, after an expiration of a period of time since a last traction control event, incrementally releasing the derating of torque toward a maximum allowable torque to be applied to the powertrain in response to the traction control event.

According to another aspect, a controller is provided that is configured to receive a traction control event signal indicating a loss of traction for a vehicle. The controller is further configured to incrementally derate a torque applied to a powertrain of the vehicle relative to a torque derate for a previous traction control event in response to the traction control event signal.

In one embodiment, the controller is configured to incrementally derate a negative braking torque applied by a regenerative braking system. In another embodiment, the controller is configured to incrementally derate a negative braking torque applied by at least one of a compression release braking system and an exhaust brake. In yet another embodiment, the controller is configured to incrementally derate a positive torque applied by at least one of a motor and an internal combustion engine of the drivetrain.

In a further embodiment, the controller is configured to incrementally derate the torque applied to the powertrain of the vehicle relative to the torque derate for the previous traction control event only if the previous traction control event occurred within a predetermined period of time from the detected traction control event. In a refinement of this embodiment, after expiration of the predetermined period of time, the controller is configured to incrementally release the derating of torque to a maximum allowable torque to be applied to the powertrain.

According to another aspect, a system is provided that includes a powertrain and a controller. The powertrain includes at least one of an internal combustion engine and an electrical device, and the powertrain is connected to a plurality of wheels and a traction control system. The controller is in communication with the traction control system and at least one of the engine and the electrical device. The controller is configured to receive a traction control event signal from the traction control system indicating a loss of traction of the wheels, and the controller is further configured to incrementally derate a torque applied to the powertrain relative to a torque derate for a previous traction control event in response to the traction control event signal.

In one embodiment, the electrical device is operably coupled to an electrical energy storage device. In another embodiment, the torque derate is a negative torque. In a further embodiment, the torque derate is a positive torque.

In yet another embodiment, the controller is connected to a regenerative braking system that automatically applies a negative braking torque to the power train in response to a lifting of an accelerator pedal associated with the powertrain and the controller is configured to incrementally derate the negative braking torque in response to the traction control event.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   detecting a plurality of traction control events for a vehicle in which the vehicle loses traction with a road surface at each traction control event; and
   in response to detecting the plurality of traction control events, incrementally derating a torque applied to a powertrain of the vehicle for a subsequent traction control event relative to a previous traction control event, wherein incrementally derating the torque includes incrementally derating the torque for a plurality of traction control events detected over a predetermined period of time.

2. The method of claim 1, wherein detecting the traction control event includes interpreting a signal from a traction control system of the vehicle indicative of a loss of traction.

3. The method of claim 2, wherein the traction control system is an anti-lock brake system of the vehicle.

4. The method of claim 1, wherein derating the torque further includes one of derating a negative braking torque and derating a positive drive torque.

5. The method of claim 4, wherein derating the torque further includes limiting the negative braking torque applied by regenerative braking.

6. The method of claim 4, wherein derating the torque further includes limiting the negative braking torque applied by compression release braking.

7. The method of claim 4, wherein derating the torque further includes limiting the negative braking torque applied by exhaust braking.

8. The method of claim 1, further comprising, after an expiration of a period of time since a last traction control event, incrementally releasing the derating of torque toward a maximum allowable torque to be applied to the powertrain in response to the traction control event.

9. An apparatus, comprising:
   a controller configured to receive a traction control event signal indicating a loss of traction for a vehicle, wherein the controller is further configured to incrementally derate a torque applied to a powertrain of the vehicle relative to a torque derate for a previous traction control event in response to the traction control event signal, wherein the controller is configured to incrementally derate the torque applied to the powertrain of the vehicle relative to the torque derate for the previous traction control event only if the previous traction control event occurred within a predetermined period of time from the detected traction control event.

10. The apparatus of claim 9, wherein the controller is configured to incrementally derate a negative braking torque applied by a regenerative braking system.

11. The apparatus of claim 9, wherein the controller is configured to, after expiration of the predetermined period of time, incrementally release the derating of torque to a maximum allowable torque to be applied to the powertrain.

12. An apparatus, comprising:
   a controller configured to receive a traction control event signal indicating a loss of traction for a vehicle, wherein the controller is further configured to incrementally derate a torque applied to a powertrain of the vehicle relative to a torque derate for a previous traction control event in response to the traction control event signal, wherein the controller is configured to incrementally derate a negative braking torque applied by at least one of a compression release braking system and an exhaust brake.

13. An apparatus, comprising:
   a controller configured to receive a traction control event signal indicating a loss of traction for a vehicle, wherein the controller is further configured to incrementally derate a torque applied to a powertrain of the vehicle relative to a torque derate for a previous traction control event in response to the traction control event signal, wherein the controller is configured to incrementally derate a positive torque applied by at least one of a motor and an internal combustion engine of the drivetrain.

14. A system, comprising:
   a powertrain including at least one of an internal combustion engine and an electrical device, the powertrain being connected to a plurality of wheels and a traction control system; and
   a controller in communication the traction control system and at least one of the engine and the electrical device, the controller configured to receive a traction control event signal from the traction control system indicating a loss of traction of the wheels, the controller further configured to incrementally derate a torque applied to the powertrain relative to a torque derate for a previous traction control event in response to the traction control event signal, wherein the controller is connected to a regenerative braking system that automatically applies a negative braking torque to the power train in response to a lifting of an accelerator pedal associated with the powertrain and the controller is configured to incrementally derate the negative braking torque in response to the traction control event.

15. The system of claim 14, wherein the electrical device is operably coupled to an electrical energy storage device.

16. The system of claim 14, wherein the torque derate is a negative torque.

17. A system, comprising:
   a powertrain including at least one of an internal combustion engine and an electrical device, the powertrain being connected to a plurality of wheels and a traction control system; and a controller in communication the traction control system and at least one of the engine and the electrical device, the controller configured to receive a traction control event signal from the traction control system indicating a loss of traction of the wheels, the controller further configured to incrementally derate a torque applied to the powertrain relative to a torque derate for a previous traction control event in response to the traction control event signal, wherein the torque derate is a positive torque.

* * * * *